United States Patent
Regen et al.

(10) Patent No.: US 11,613,315 B1
(45) Date of Patent: Mar. 28, 2023

(54) JACKKNIFE PREVENTION SYSTEM

(71) Applicants: David M Regen, Nashville, TN (US);
Ingrid L Regen, Sudbury, MA (US);
Samuel M Regen, Fairfield, CA (US)

(72) Inventors: David M Regen, Nashville, TN (US);
Ingrid L Regen, Sudbury, MA (US);
Samuel M Regen, Fairfield, CA (US)

( * ) Notice: Subject to any disclaimer, the term of this patent is extended or adjusted under 35 U.S.C. 154(b) by 0 days.

(21) Appl. No.: 17/739,323

(22) Filed: May 9, 2022

Related U.S. Application Data

(60) Provisional application No. 63/235,247, filed on Aug. 20, 2021.

(51) Int. Cl.
*B62D 53/08* (2006.01)
*B60T 8/24* (2006.01)

(52) U.S. Cl.
CPC .......... *B62D 53/0878* (2013.01); *B60T 8/248* (2013.01)

(58) Field of Classification Search
CPC .. B62D 53/0871; B62D 53/0878; B60T 8/248
See application file for complete search history.

(56) References Cited

U.S. PATENT DOCUMENTS

| | | | | |
|---|---|---|---|---|
| 4,798,419 A * | 1/1989 | Barnes | ...................... | B60T 11/18 303/14 |
| 5,001,639 A * | 3/1991 | Breen | ...................... | B60T 17/22 303/123 |
| 5,018,799 A * | 5/1991 | Rutledge, Jr. | ......... | B60T 17/002 303/118.1 |
| 5,116,107 A * | 5/1992 | Hull | ...................... | B60T 13/263 303/54 |
| 10,500,975 B1 * | 12/2019 | Healy | ................. | B60L 15/2027 |
| 2013/0253762 A1 * | 9/2013 | Clark | ...................... | B60T 8/885 701/34.4 |
| 2014/0343813 A1 * | 11/2014 | Morselli | ............... | B60T 13/686 180/14.1 |
| 2015/0336548 A1 * | 11/2015 | Morselli | ............... | B60T 11/203 701/70 |
| 2018/0334151 A1 * | 11/2018 | Eckert | ...................... | B60T 8/00 |
| 2019/0001944 A1 * | 1/2019 | Ying | ................... | B60T 8/17551 |
| 2019/0322273 A1 * | 10/2019 | Wu | ....................... | B60W 30/09 |

(Continued)

FOREIGN PATENT DOCUMENTS

DE 102008014459 A1 * 9/2009 ............ B60T 13/263

*Primary Examiner* — Kevin Hurley
*Assistant Examiner* — Maurice L Williams

(57) ABSTRACT

A jackknife-prevention system for a tractor-trailer rig wherein the present invention is operable to engage the front brakes of the tractor-trailer tractor so as to oppose and reverse a jackknife movement upon detection thereof. The present invention includes a lateral-acceleration sensor that is mounted in the cab of a tractor trailer and transmits power from a source to a left-side circuit or right-side circuit if the tractor is skidding leftward or rightward, respectively. A steering direction sensor is configured to transmit power from said left-side circuit to both of two stopcock assemblies when steering is leftward or from said right-side circuit to both of two stopcock assemblies when steering is rightward, the stopcock assemblies responding to power input by decompressing both front-wheel brake chambers. This action, allowing the front wheels to roll when steered in the direction of a sideward skid, helps align the tractor with its trajectory.

6 Claims, 4 Drawing Sheets

(56) References Cited

U.S. PATENT DOCUMENTS

| | | | |
|---|---|---|---|
| 2020/0238960 A1* | 7/2020 | Thompson | A01B 59/002 |
| 2020/0238990 A1* | 7/2020 | Ma | B60W 30/18 |
| 2021/0086732 A1* | 3/2021 | Kim | B60W 30/165 |
| 2021/0162972 A1* | 6/2021 | Schnittger | B60T 15/02 |
| 2022/0185274 A1* | 6/2022 | Singh | B60T 8/34 |

* cited by examiner

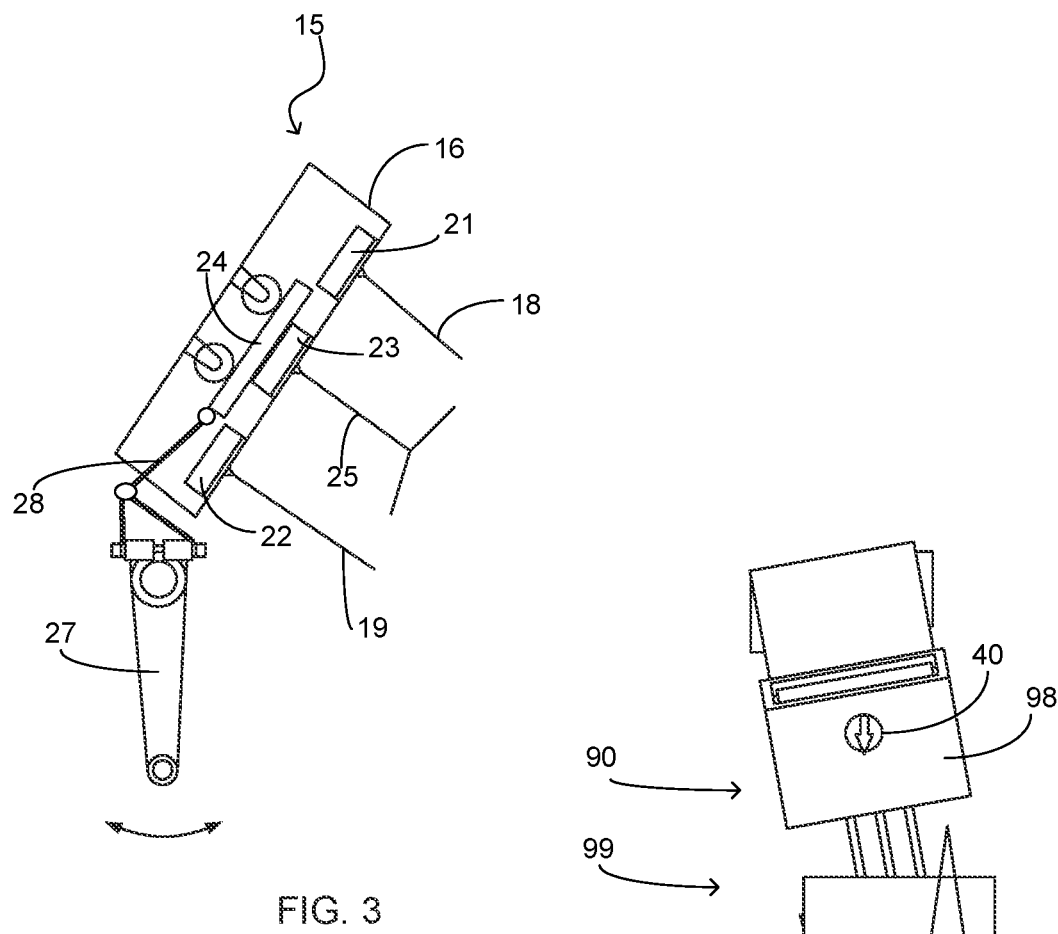
FIG. 3
FIG. 4
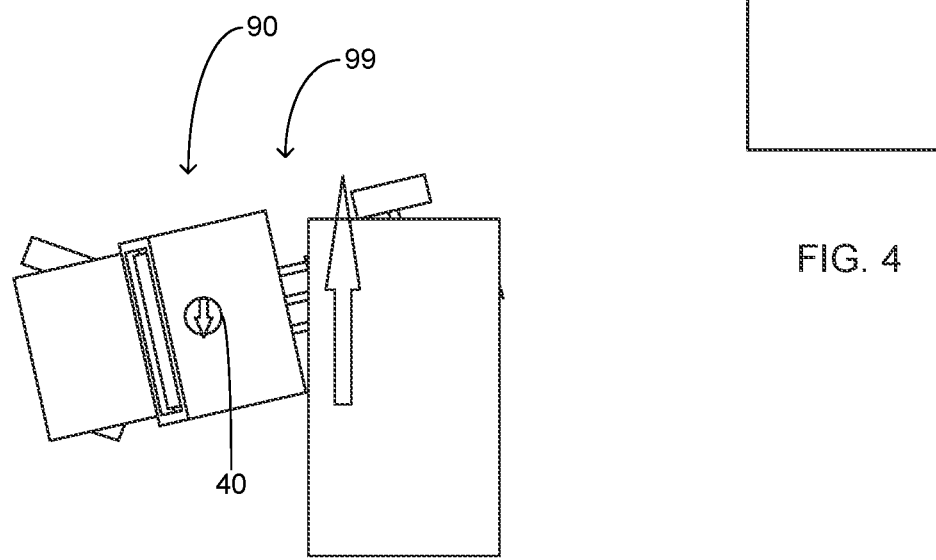
FIG. 5

JACKKNIFE PREVENTION SYSTEM

PRIORITY UNDER 35 U.S.C Section 119(e) & 37 C.F.R. Section 1.78

This nonprovisional application claims priority based upon the following prior United States Provisional Patent Application entitled: Semi Truck Anti-Jackknife System, Application No.: 63/235,247 filed Aug. 20, 2021, in the name of David M. Regen, which is hereby incorporated by reference for all purposes.

FIELD OF THE INVENTION

The present invention relates generally to vehicle safety systems, more specifically but not by way of limitation, an anti-jackknife system configured to be employed on tractor trailers and other similar vehicle configurations wherein the system of the present invention is operable to detect a jackknifing incident and execute the necessary vehicle commands so as to eliminate the continuation of the jackknifing incident.

BACKGROUND

Millions of tractor-trailers traverse local roads and highways everyday. These vehicles can weigh up to eighty thousand pounds and often have to drive in adverse conditions. When driving in adverse conditions and even safe conditions, these tractor-trailer rigs can often encounter the risk of having the rig jackknife. As is known in the art, a jackknife situation occurs when a rear trailer is advancing faster than the front of the tractor-trailer and further includes lateral acceleration. This same phenomenon can occur with other types of vehicle configurations such as but not limited to a conventional pickup truck towing a boat. This can result from driving on reduced friction roads such as but not limited to wet pavement or ice and can further occur when a driver of a tractor-trailer executes a rapid maneuver perhaps to avoid an accident with an obstacle or another vehicle.

Current technology is not significantly employed most likely due to the complications and cost of installing the existing systems. Many of the existing systems that attempt to address the ability to inhibit or reduce jackknifing situations are focused on mechanical implements that are operable to inhibit the movement of the articulation joint between a tractor and a trailer. These suggested modifications cannot only be expensive but further limit or inhibit the compatibility of components, which renders the rig less versatile. For the foregoing reasons and others, most tractor-trailers do not have installed nor utilize a jackknife prevention system and as such thousands of these types of accidents occur every year.

Accordingly, there is a need for a jackknife prevention system that is operable to be installed on a tractor-trailer or similar vehicle wherein the present invention utilizes lateral acceleration detection and steering angle detection which results in subsequent automated braking control so as to prevent jackknifing of a tractor-trailer.

SUMMARY OF THE INVENTION

It is the object of the present invention to provide a jackknife prevention system that is configured to inhibit jackknifing of a tractor-trailer rig wherein the present invention requires no mechanical restraint of the tractor-trailer angle.

Another object of the present invention is to provide an anti-jackknife system for a tractor-trailer wherein the present invention is configured to have at least one lateral-acceleration sensor operable to detect lateral acceleration of the tractor of the tractor-trailer.

A further object of the present invention is to provide a jackknife prevention system that is configured to inhibit jackknifing of a tractor-trailer rig wherein the present invention includes a steering-direction sensor operable to detect significant leftward or rightward steering of the front wheels of the tractor of the tractor-trailer.

Still another object of the present invention is to provide an anti-jackknife system for a tractor-trailer involving a pitman-arm monitor that is configured to report significant leftward or rightward steering of a tractor trailer tractor.

An additional object of the present invention is to provide a jackknife prevention system that is configured to inhibit jackknifing of a tractor-trailer rig wherein the lateral-acceleration detector includes an inertial switch that closes a left-side or right-side circuit depending on direction of lateral acceleration.

Yet a further object of the present invention is to provide an anti-jackknife system for a tractor-trailer wherein the present invention includes a pitman-arm monitor that closes a segment of left-side circuit or right-side circuit within the monitor depending on direction of steering.

Another object of the present invention is to provide a jackknife prevention system that is configured to inhibit jackknifing of a tractor-trailer rig wherein the lateral-acceleration detection component further includes the employment of a mobile conductor.

Still an additional object of the present invention is to provide an anti-jackknife system for a tractor-trailer wherein the present invention includes a brake control component further having elements such as but not limited to stopcocks in the front-brake hoses so as to release pressure in both front wheel brake chambers when activated.

Yet another object of the present invention is to provide a jackknife prevention system that is configured to inhibit jackknifing of a tractor trailer rig wherein the present invention restores alignment of a sideward-skidding tractor with its trajectory.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

FIG. 3 is a detailed view of the pitman-arm monitor of the present invention; and FIG. 4 is a schematic view of an initial jackknife movement of a tractor trailer rig; and FIG. 5 is a schematic view of a fully jackknifed tractor trailer rig.

DETAILED DESCRIPTION

Figure 1:
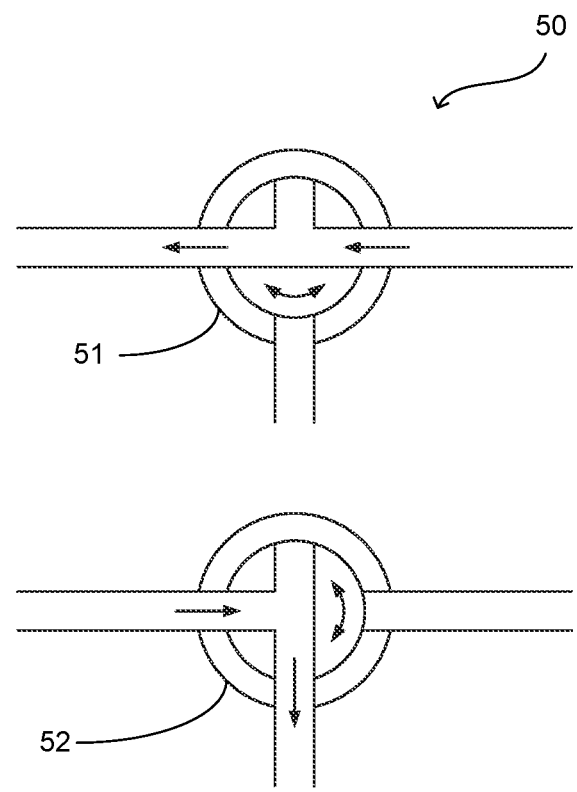
FIG. 1 is a detailed view of a stopcock in two positions of the present invention.
Figure 2:
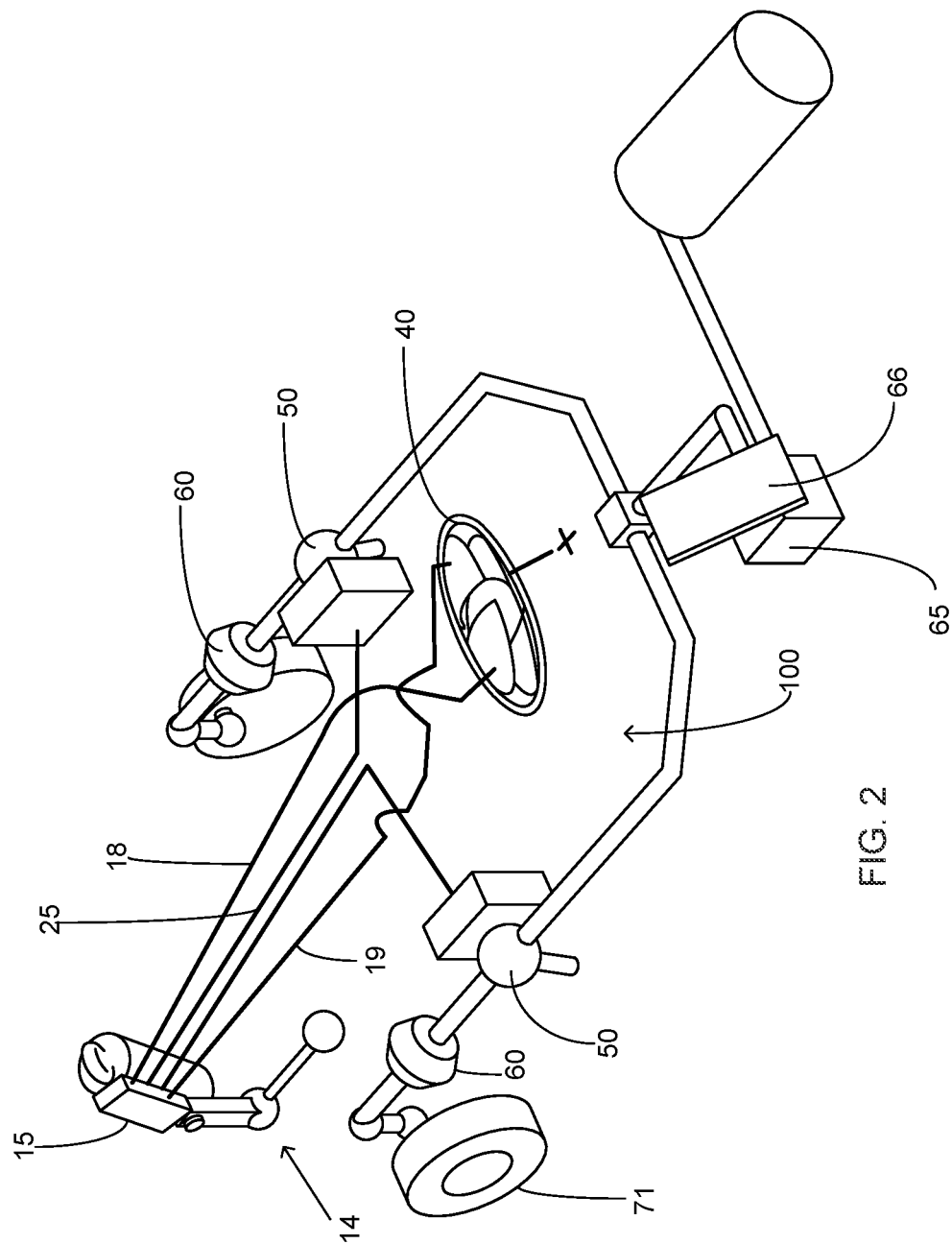
FIG. 2 is a schematic of the present invention with custom designed sensors and with no relay.
Figure 6:
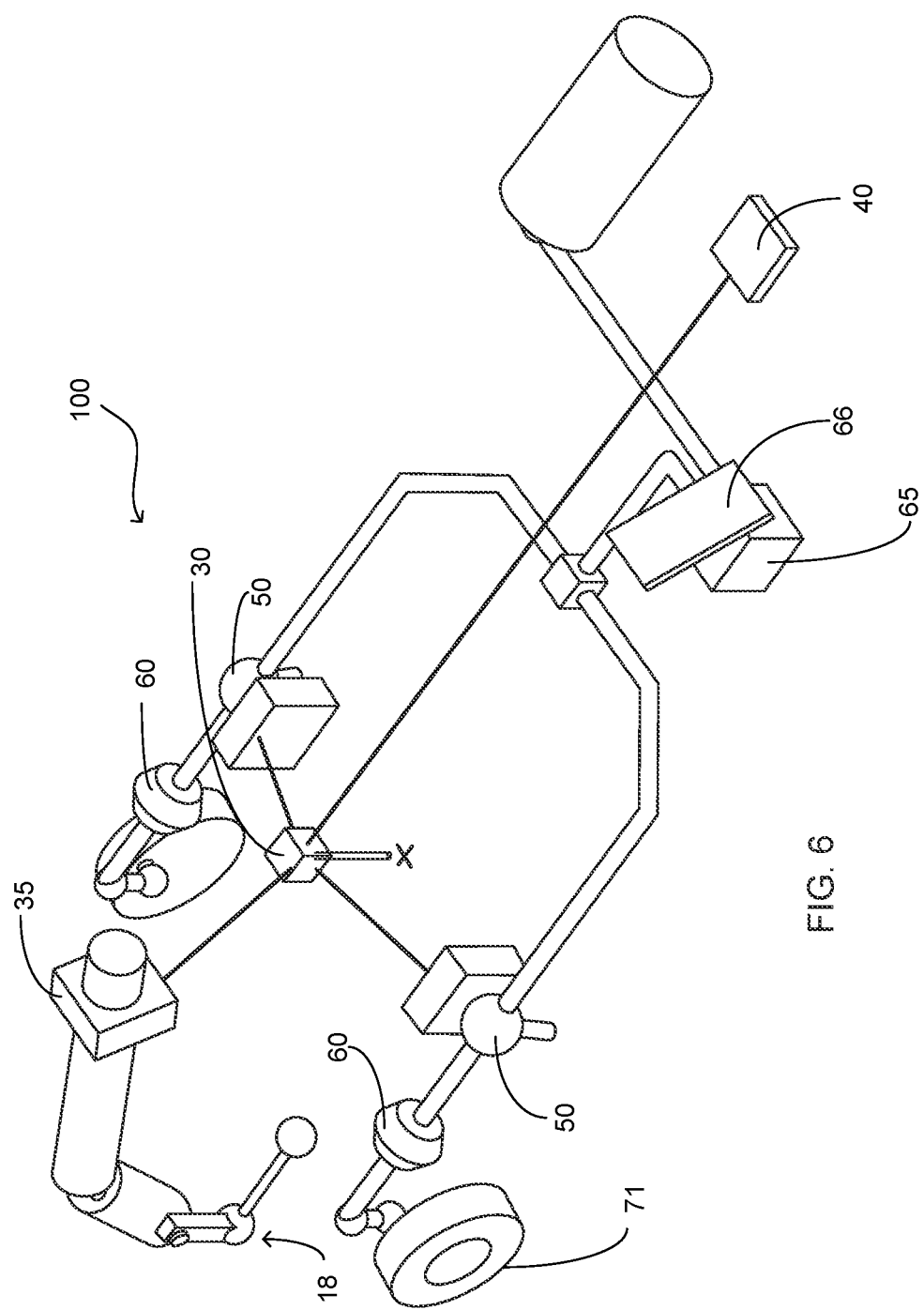
FIG. 6 is an alternate embodiment schematic of the present invention involving existing commercially available sensors and a relay.

Referring now to the drawings submitted herewith, wherein various elements depicted therein are not necessarily drawn to scale and wherein through the views and figures like elements are referenced with identical reference numerals, there is illustrated a jackknife prevention system 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted as a part hereof, the jackknife prevention system 100 is comprised of the following. The battery's voltage (+) can be transmitted to the stopcock assemblies 50 via a lateral acceleration sensor 40 and a steering direction sensor 15 connected in a left-side series 18 and a right-side series 19. When both sensors (acceleration 40 and steering 15) are left-side on, voltage is transmitted via conductors 18 and 25 to and activates both stopcocks 50 to deflate 52 both brake chambers 60. When both sensors (acceleration 40 and steering 15) are right-side on, voltage is transmitted via conductors 19 and 25 to and activates both stopcocks 50 to deflate 52 both brake chambers 60. Any other combination of sensor-switch positions leaves the stopcocks at rest 51, allowing the front brakes to respond normally to the brake pedal 66. The result of this design is that the front wheels 71 are unbraked 52 when steered to the side that inertia is taking the tractor 90, allowing the front of the tractor 90 to advance faster than its rear, this quickly restoring alignment of the tractor with its trajectory (FIG. 4 and FIG. 5, large arrow), at which time the lateral acceleration and steering angle will cease to evoke front wheel un-braking, so normal responses to brake pedal actions will be restored.

One version of lateral-acceleration sensor 40 is a non-conductive prolate-spheroidal shell whose long axis is transverse to the cab 98, this shell containing a conductive ball perhaps mercury surrounded by low-viscosity non-conductive fluid perhaps inert gas as damper. The floor of the shell is covered with a conductive layer contacting the bottom of the conductive ball and joined to a charged cable (+) from the battery. The ceiling of the shell has a left-side conductive layer joined to an output cable 18 and a right-side conductive layer joined to an output cable 19, these cables leading to respective sessile contacts 21,22 in the steering-direction sensor 15 (or 35). The conductive ball electrically joins the bottom conductive layer with the left or right ceiling conductive layer if the tractor experiences sufficient lateral acceleration. The ball moves laterally as would any object sitting on the dashboard. An alternative lateral-acceleration sensor could be a hinged pendulum with appropriate electrical contacts.

The steering-angle sensor 15 contains a row of three sessile contacts 21,22,23 and a mobile contact 24 sliding on and always touching the middle sessile contact 23. Leftward steering is accomplished by forward swing of the pitman arm 27 on the steering-gear output axle. Owing to a connecting structure 28, this pushes the mobile contact 24 up where it touches the left side sessile contact 21, which will transmit any voltage coming from the left side of the lateral-acceleration sensor via conductor 18 to the output conductor 25 which transmits any voltage to both stopcock assemblies 50. That voltage will be positive only if the lateral-acceleration ball is touching its left-side conductive layer. Analogously, rightward steering is accomplished by backward swing of the pitman arm 27 on the steering-gear output axle. Owing to the connecting structure 28, this pulls the mobile contact 24 down where it touches the right-side sessile contact 22, which will transmit any voltage coming from the right side of the lateral-acceleration sensor via conductor 19 to the output conductor 25, which transmits any voltage to both stopcock assemblies 50. That voltage will be positive only if the lateral-acceleration ball is touching its right-side conductive layer.

An alternative version of the Jackknife prevention system, a commercially available accelerometer 40 and commercially available steering column monitor 35 would send their signals to a relay 30 which draws tiny currents from the sensors and supports larger currents drawn by the stopcock assemblies 50 from the battery (+).

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A jackknife-prevention system configured to be operably coupled to a tractor-trailer tractor wherein the jackknife prevention system comprises: a lateral-acceleration sensor, said lateral-acceleration sensor being mounted to the tractor of said tractor-trailer and operably coupled to the tractor's power supply, said lateral-acceleration sensor operable to pass power to a left-side circuit or right-side circuit when the tractor is skidding leftward or rightward respectively; a steering-direction sensor, said steering-direction sensor being operably coupled to said left-side and right-side circuits, said steering-direction sensor configured to pass power to both of two stopcock assemblies from the left-side circuit when steering is leftward and from the right-side circuit when steering is rightward, wherein said steering direction sensor is operably coupled to a component of a steering system of the tow vehicle and wherein the steering direction sensor includes three sessile contacts and a mobile contact that are operable to transmit a first signal, a second signal and a third signal configured to determine a position; and said two stopcock assemblies, each stopcock assembly operationally coupled to a front-brake chamber, both said two stopcock assemblies being activated by power passing from the power source through the left-side circuit owing to leftward steering together with leftward skidding or through the right-side circuit owing to rightward steering together with rightward skidding, said two stopcock assemblies when so activated blocking movement of compressed air to both front-wheel brake chambers and allowing compressed air to escape from both front-wheel brake chambers to the atmosphere, wherein the two stopcock assemblies include a first position and a second position, in said first position said two stopcock assemblies allowing normal braking responses to brake-peddle actions, said jackknife-prevention system therefore disabling front-wheel brakes when the tractor is skidding sideward and the front wheels are steered in the direction that would restore alignment of said tractor with its trajectory were they allowed to roll.

2. The jackknife-prevention system as recited in claim 1, wherein the lateral-acceleration sensor is operable to transmit a first signal, a second signal and a third signal to said stopcock assemblies.

3. The jackknife-prevention system as recited in claim 2, wherein upon receipt of said first signal from said steering-direction sensor and said first signal from said lateral acceleration sensor said stopcock assemblies reduce pressure on at least one brake chamber.

4. The jackknife-prevention system as recited in claim 3, wherein upon receipt of said second signal from said steering-direction sensor and said second signal from said lateral-acceleration sensor said stopcock assemblies reduce pressure in the at least one brake chamber.

5. The jackknife-prevention system as recited in claim 4, wherein upon receipt of said third signal from said steering-direction sensor and said third signal from said lateral-acceleration sensor said stopcock assemblies are idle and do not adjust pressure of the at least one brake chamber.

6. The jackknife-prevention system as recited in claim 5, wherein the jackknife prevention system can further include at least one relay, wherein the at least one relay is configured to transmit signals intermediate components of the jackknife prevention system.

* * * * *